United States Patent [19]

Hurvig

[11] Patent Number: 5,867,652
[45] Date of Patent: Feb. 2, 1999

[54] METHOD AND APPARATUS FOR SUPPORTING MULTIPLE OUTSTANDING NETWORK REQUESTS ON A SINGLE CONNECTION

[75] Inventor: Hans Hurvig, Kirkland, Wash.

[73] Assignee: Microsoft Corporation, Redmond, Wash.

[21] Appl. No.: 953,837

[22] Filed: Oct. 14, 1997

Related U.S. Application Data

[63] Continuation of Ser. No. 343,659, Nov. 22, 1994, Pat. No. 5,678,007.

[51] Int. Cl.$^6$ ....................................................... G06F 13/14
[52] U.S. Cl. ..................................... 395/200.33; 370/394
[58] Field of Search ........................... 395/200.3, 200.33, 395/200.57, 200.68, 800.01, 376, 670, 680, 682; 370/254, 357, 894

[56] References Cited

U.S. PATENT DOCUMENTS

| | | |
|---|---|---|
| 5,175,851 | 12/1992 | Johnson et al. .............................. 707/8 |
| 5,287,504 | 2/1994 | Carpenter et al. ....................... 707/201 |
| 5,329,619 | 7/1994 | Page et al. ........................... 395/200.33 |
| 5,341,499 | 8/1994 | Doragh ..................................... 395/681 |
| 5,396,630 | 3/1995 | Banda et al. ............................. 395/683 |
| 5,404,523 | 4/1995 | DellaFera et al. ....................... 395/671 |
| 5,416,775 | 5/1995 | Van Nielen .............................. 370/440 |
| 5,440,545 | 8/1995 | Buchholz et al. ....................... 370/426 |
| 5,453,982 | 9/1995 | Pennington et al. .................... 370/235 |
| 5,493,569 | 2/1996 | Buchholz et al. ....................... 370/442 |

OTHER PUBLICATIONS

"Novell's Netware Code Protocol", by P. Szcerbina, Dr.Dobb's Journal, Nov. 1993, pp. 123–132.

*Primary Examiner*—Alpesh M. Shah
*Attorney, Agent, or Firm*—Leydig, Voit & Mayer, Ltd.

[57] ABSTRACT

An apparatus and method are disclosed for supporting a plurality of outstanding requests between a client and server in a network. If the server completes computation of a later request from a client before an earlier request, then the network protocol supports transmission of responses in an out-of-order manner to the client, thereby allowing a high degree of parallelism on the client and the server. The server buffers responses until receiving an implicit acknowledgement from the client.

20 Claims, 5 Drawing Sheets

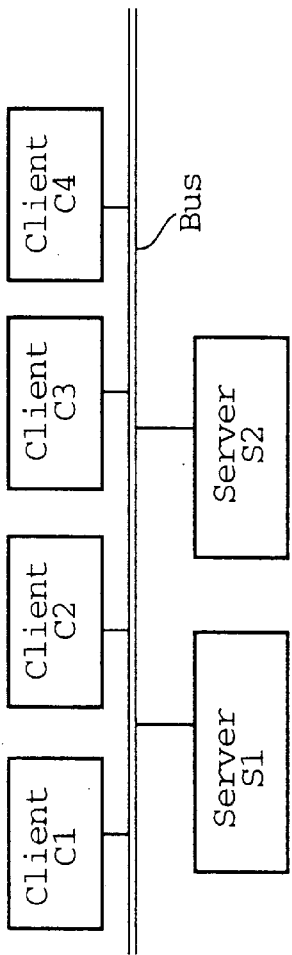

| SUMMARY OF ACTION | CLIENT | | | SERVER | | |
|---|---|---|---|---|---|---|
| Client <--> Server | SNXT | SMIN | FLAG | SNEW | RNEW | BUF |
| initial state | 0 | 0 | 000 | 0 | 0 | --- |
| request 0 --> | 1 | 0 | 100 | 1 | 0 | --- |
| <-- response 0 | 1 | 1 | 000 | 1 | 1 | 0-- |
| request 1 --> | 2 | 1 | 100 | 2 | 2 | 0-- |
| request 2 --> | 3 | 1 | 110 | 3 | 0 | 0-- |
| request 3 --> | 4 | 1 | 111 | 4 | 1 | --- |
| <-- response 1 | 4 | 2 | 110 | 4 | 1 | -1- |
| re-request 2 --> | 4 | 2 | 110 | 4 | 1 | -1- |
| request 4 --> | 5 | 2 | 111 | 5 | 2 | --- |
| <-- response 3 | 5 | 2 | 101 | 5 | 2 | 3-- |
| <-- response 2 | 5 | 4 | 100 | 5 | 2 | 3-2 |
| request 5 --> | 6 | 4 | 110 | 6 | 0 | 3-- |
| <-- response 5 | 6 | 4 | 100 | 6 | 0 | 3-5 |
| <-- response 4 | 6 | 6 | 000 | 6 | 0 | 345 |
| request 6 --> | 0' | 6 | 100 | 0' | 1 | -45 |
| request 0' --> | 1' | 6 | 110 | 1' | 2 | --5 |
| drop <-- response 0' | 1' | 6 | 110 | 1' | 2 | -0'5 |
| request 1' --> | 2' | 6 | 111 | 2' | 0 | -0'- |
| re-request 0' --> | 2' | 6 | 111 | 2' | 0 | -0'- |
| <-- re-respond 0' | 2' | 6 | 101 | 2' | 0 | -0'- |
| <-- response 6 | 2' | 1' | 100 | 1' | 0 | 60'- |
| <-- response 1' | 2' | 2' | 000 | 2' | 0 | 60'1' |

FIG. 6

METHOD AND APPARATUS FOR SUPPORTING MULTIPLE OUTSTANDING NETWORK REQUESTS ON A SINGLE CONNECTION

This is a continuation of application Ser. No. 08/343,659, filed Nov. 22, 1994, now U.S. Pat. No. 5,678,007.

AREA OF THE INVENTION

The present invention generally relates to an apparatus and method for carrying out coordination of the interrelated activities of a plurality of computers within a network, and more specifically coordinating the issuance of network requests on a single connection and responses to the network requests between a client and a server.

BACKGROUND OF THE INVENTION

The utilization of networks as a means for fulfilling users' computing needs has increased quite substantially in recent years. Networks, especially those including a central file system shared by the networked computers, offer the advantage over stand-alone personal computers of providing users access to a wide variety of computer resources without consuming large quantities of storage space on the personal computers' local drives. The storage saving advantage is achieved by storing application programs and databases within a shared data storage device connected via a network to a plurality of client computers.

In a network environment, a server is a network entity associated with a resource shared by a network. The server receives requests for the shared network resource from network entities referred to as clients. The server acts upon the requests and issues responses to the clients.

In the example above of a shared data storage device connected to a plurality of clients, a network file server provides clients access to the data on the shared data storage device by receiving requests from the clients for resources provided by the shared data storage device, acting upon the requests, and returning a response to the clients.

One of the problems faced in performing computing tasks in a network environment is the generally longer average wait times for obtaining a response to a request for a resource in comparison to performing the same task locally. After a client transmits a request to a server, a response from the server to the client's request may be delayed because a requested network resource is not currently available. For example, the requested resource may be currently allocated solely to another client in the network, or the computer resource may be unable to respond to any client requests. Other instances in which a client may experience substantial wait times in receiving a response to a request include client requests which require a substantial amount of processing in order to complete. An extended wait time is also incurred for receiving a response to a network request when the request must be routed through a number of heavily traversed routing nodes before reaching its intended destination.

A feature of personal computer operating systems which is gaining popularity as microprocessor speeds and RAM memory capacity increases is the ability to run a plurality of processes simultaneously via time switching the plurality of processes. A personal computer maintains a list of active processes. Each of the simultaneously active processes is executed on the processor for a period of time until the process is interrupted.

In a network environment having clients capable of having a plurality of simultaneously active processes, a process running on the client typically relinquishes its claim to the processor after issuing a network request to a server so that other tasks associated with other active processes may be performed while the process waits for a response to the network request. The processor is then claimed by another one of the plurality of processes. In this environment, more than one of the plurality of simultaneously running processes may attempt to issue a network request to a same network server on a same established virtual circuit (also referred to as a "connection") between the server and the client. A connection refers to a logical conversation established between two computers (in this case a client and a server computer) where each computer maintains state information on the conversation. When developing a communication protocol for a network, one must therefore consider how to handle the situation where a second network request arises in a client computer over a connection for which a first network request is still pending.

In a network environment, it is known for a client and server to coordinate the handling of network requests from client processes in a request and acknowledge mode wherein only a single outstanding request is allowed on a connection between a client and a server. After a client transmits a first request to a server, the client withholds issuing a second request to the server on the connection until a response is received from the server for the first request. Thus, the process from which the second request arises cannot continue until a response is received by the client for the first request.

In known network communication schemes, referred to as "burst" protocols, a client transmits a series of packets of information having a same request sequence number. Each packet within the series of packets is assigned a packet sequence identifier. The "burst" protocol has been used to fragment and then reassemble a virtual packet that, due to restrictions on packet size, cannot be transmitted in a single packet. A fragment list in a response message from the server to the client indicates the ones of the series of packets of information having a same request sequence number that have been successfully received by the server.

The above described multi-packet request protocol for coordinating communications between a client and server does not however permit a second process running on a client to submit a network request to a server on a connection while a first request is pending on the connection until the server has successfully responded to the first request on the connection. The inability of a multi-processing client and a server to support simultaneous multiple outstanding requests on a single client/server connection and to respond to the requests in a different order than the requests were submitted by the client, leads to blocking of the process associated with the second request on the connection.

In other known network communication schemes such as SPX-II, a client submits multiple requests. However, the requests must be processed and replied to in sequence. The known communication protocol resembles a two-way pipeline between a client and server where order is strictly adhered to by the client and the server. This communication scheme does not prevent the blocking of a second network request while a server computes a response to a first network request.

SUMMARY OF THE INVENTION

It is a general object of the present invention to improve exploitation of client and server resources in a network.

It is a more specific object of the present invention to prevent blocking in a multi-processing environment of a client process submitting a network request on a connection while the client waits for a response to a prior request on the connection.

It is yet another specific object of the present invention to enable a server to submit a response to a client's request on a connection immediately after completing processing of the request regardless of whether the server has transmitted a response to a previous request from the client on the connection.

The above described and other objects are fulfilled by a new apparatus and method for coordinating the operation of a client and server within a network. A client submits a sequence of up to N independent requests to a server on a connection. Where SMIN is a sequence value for an oldest outstanding request for a client/server connection, the client will not issue a request having a sequence value equal to "N+SMIN" until receiving a response packet for a request packet having a sequence value equal to SMIN. The server transmits response packets for the outstanding requests in the order in which the requested operations are completed regardless of the sequence values for the requests.

In addition, the server buffers up to N past responses on the connection in order to quickly respond to a client's re-transmitted request in the event of a dropped response. Furthermore, receipt by the server of a request from the client on the connection having a sequence value S acts as an implicit acknowledgement of the response to a prior request packet on the connection having the sequence value equal to "S-N." Therefore upon receiving the request having the sequence value S from a client, the server removes the response to the request having sequence value equal to "S-N" from the server's response buffer for the client.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 1 is a schematic drawing of an exemplary computer network environment embodying the present invention;

FIG. 2 is a schematic drawing of a portion of an illustrative network packet header format facilitating implementation of a set of transport rules for network communication between a client and server in accordance with the present invention;

FIG. 6 is a schematically illustrated sequence of requests and responses between a client and server in accordance with the illustrative embodiment of the present invention.

DETAILED DESCRIPTION OF ILLUSTRATIVE EXBODIMENTS

Figure 3:
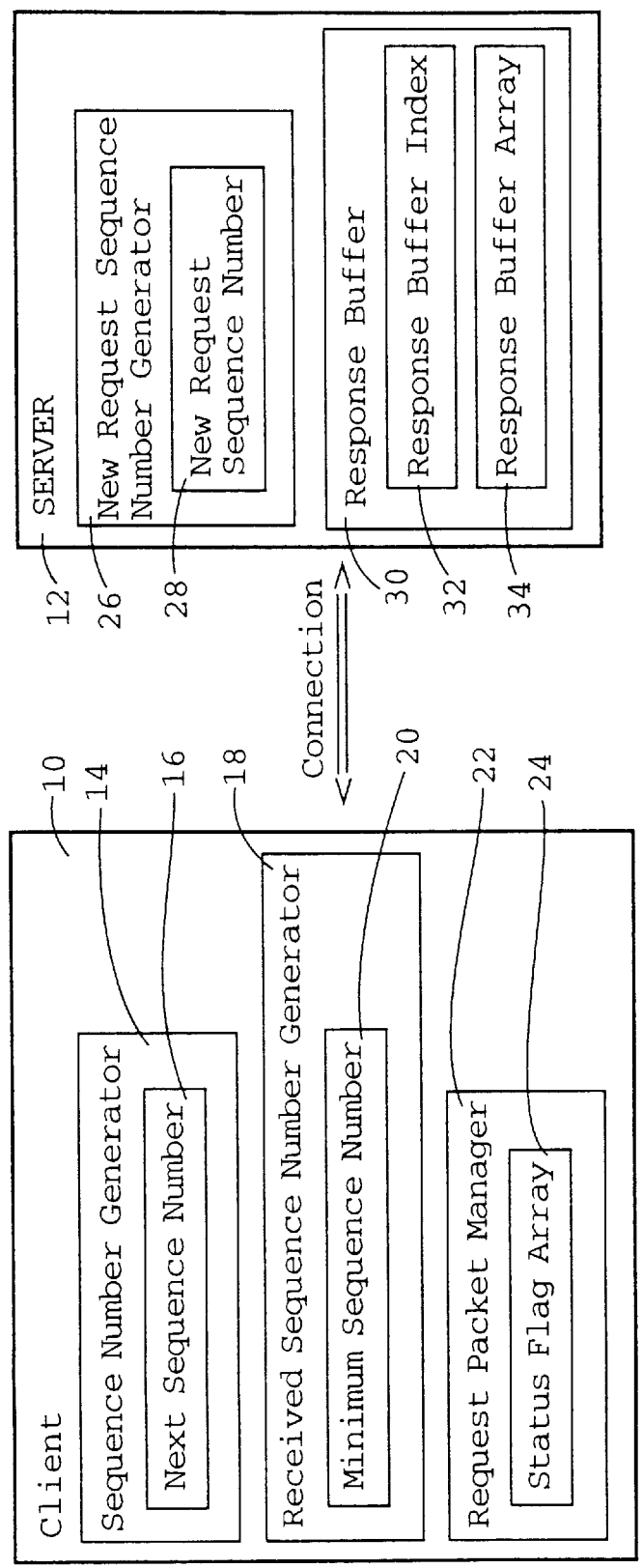
FIG. 3 is a schematic drawing of a client and server identifying portions of the client and server facilitating multiple outstanding request packets on a single client/server connection in accordance with an illustrative embodiment of the present invention.

Though the method and apparatus for supporting a plurality of outstanding requests between a client and server can exist in a minimal environment containing a single client and a single server, the present invention is typically embodied in a computer network having at least one server and a plurality of client computers such as the local area network schematically illustrated in FIG. 1. The computer network schematically illustrated in FIG. 1 comprises a plurality of client computers C1, C2, C3, and C4 communicatively coupled to server computers S1 and S2 in a bus network configuration. The client computers C are personal computers of conventional design capable of maintaining a plurality of simultaneous active processes. The client computers transmit network requests to the server computers S via the Bus.

The server computers S receive and compute responses to the requests from the client computers C. Thereafter, the server computers S transmit responses to the client computers C via the bus which may comprise for example an Ethernet bus. The server computers S control and coordinate shared usage by the client computers C of shared network resources. Examples of shared computer resources are network file storage devices and printers. It is noted that even though the illustrative network in FIG. 1 classifies each of the constituent computers as either a client computer or a server computer, a computer may be either or both a server or client depending upon the present functions being performed by the computer.

It is also noted that even though the illustrative network topology in FIG. 1 comprises a bus architecture, the invention is not limited to any specific network topology. For example, the present invention may be incorporated into other networks including for example ring, tree and star networks. Other acceptable network topologies would be known to those skilled in the art of network architectures.

Turning now to FIG. 2, a schematic drawing is provided of a portion of the known NetWare Core Protocol (NCP) transport layer packet header. Though a brief description of the content and function of a portion of the NCP packet header follows below, a more detailed description is provided in "Novell's NetWare Core Protocol," *Dr. Dobb's Journal*, November 1993, pp. 123–132 by Pawel Szczerbina.

Bytes 0 and 1 of the NCP packet header designate the packet type. Bytes 0 and 1 of the NCP packet header each contain the value "22" for a request packet and the value "33" for a reply packet.

Byte 2 designates a packet sequence number. The sequence numbers have a range of 0 to 255. The packet sequence number for a packet is set by the client. The server copies the sequence number of a request packet into a corresponding response packet in order to enable the client to associate a response packet with a request.

Bytes 3 and 5 provide a 16-bit connection number. The value stored within these combined fields is designated in a known manner during initial set up of the connection between the client and server. Thereafter, all request and response packets associated with the connection contain this number. The purpose of the connection number is to enable the server to distinguish requests from different connected clients.

Byte 4 of the NCP packet header contains a task number. The task number identifies the process running on the client from which the request originates and allows process-specific semantics to be implemented on server resources. For example, a file on the server may be locked in response to a request from a specific process running on the client in order to prevent other processes having different task numbers from accessing the locked file.

The illustrative embodiment of the present invention utilizes the NCP packet header format for coordinating requests and responses between a client and server. However, the procedures executed by the client and the server for handling the requests and responses are modified as described hereinbelow to support multiple outstanding requests which may be responded to in an out-of-order fashion by the server. It should be noted that the present invention is not limited to networks utilizing the NCP packet format. Other suitable packet header formats would be known to those of ordinary skill in the art.

In the illustrative embodiment of the present invention, a client and server utilize a set of two values defining the behavior of the system. As in the known methods and apparatuses utilizing the NCP packet header format, a first number M defines a range of sequence numbers (from 0 to M−1) in the sequence number field for identifying a packet. While one may conceivably have an effectively boundless sequence of numbers for the packets, it is preferred to define a reasonable limit on the upper bound for the sequence number and then start over at zero each time the upper limit is reached. An acceptable number for M is 256 which enables the sequence number to be represented by a single byte of data.

Unlike known methods and apparatuses utilizing the NCP packet header format, a second number N sets the maximum number of outstanding requests for a specified client and server connection. In the illustrative embodiment of the present invention, the value N corresponds to the maximum difference between the sequence number of an oldest request from a client for which the client has yet to receive a response packet from a server and the next sequence number to be inserted by the client into a request packet for the server. Therefore, where a variable (value) SNXT corresponds to a next sequence number to be assigned to a request packet from a client to a server on a connection, and a variable SMIN corresponds to a sequence number of the oldest outstanding request packet (when SMIN does not equal SNXT), whether a client may transmit a request packet having a sequence number S equal to SNXT to a server is governed by the following relation:

$$SNXT < SMIN+N \qquad \text{Rule 1}$$

Thus, a maximum range of sequence numbers for outstanding requests for a single connection is limited to N outstanding requests. If a process wants to submit a request for transmission from a client to a server while N requests are presently outstanding (i.e., SNXT=SMIN+N), then the request is blocked at the client until the client receives a response corresponding to the request having a sequence number SMIN.

It is also noted that the relationship expressed in Rule 1 does not take into consideration the recycling of sequence numbers. However, in actual implementation, Rule 1 is executed in accordance with modulo math techniques and the maximum sequence number. This modification of Rule 1, described below in conjunction with the steps summarized in FIG. 4, will be known to those skilled in the art.

It should be noted that in accordance with one aspect of the invention, the server is permitted to respond to requests out of order. Rule 1 is based upon the values of sequence numbers associated with outstanding requests on a connection and not the actual number of outstanding requests. Therefore, in instances where a server has responded out of order, the maximum number of outstanding packets permitted by the system is less than the value N since the value of SMIN only increases when the oldest outstanding request, having a sequence number equal to SMIN, is received by the client.

A set of N flag bits (described hereinbelow) are maintained by the client for each connection to a server in order to identify the status of up to N outstanding network requests from client processes to the connected server.

An example of a value for N is eight (8) since it is unlikely under normal operating conditions that more than eight (8) requests from a client to a server on a connection will be simultaneously pending. However, other values of N may, of course, be selected based upon the frequency with which client computers are likely to request network requests on a same connection and/or the typical time required for a client to receive a response to a request on the connection.

The Client Data Structures

A client and server maintain status and data information records for each client/server connection. The components of the client and server associated with a single connection are illustrated in FIG. 3. The combination of status registers, buffers and index registers for reading and modifying the contents of the status registers and buffers enable the client and server to maintain status information on, and respond in an out-of-order manner to, multiple outstanding requests from a client to a server. The capability to respond to multiple outstanding requests in an out-of-order manner reduces the possibility that simultaneously running processes will block on a client computer before submitting a request to a server when more than one process is simultaneously requesting the computer resources provided by a same server.

Turning now to FIG. 3, a client 10 includes a Sequence Number Generator 14 for providing a sequence of values for insertion into request packets from the client 10 to the server 12. The Sequence Number Generator 14 includes a Next Sequence Number field 16 holding a value SNXT for tracking the status of outstanding requests to the server 12. The value SNXT represents the sequence number inserted by the client 10 within an NCP packet header containing a next request from the client 10 to the server 12. In the illustrative embodiment, the value SNXT ranges from zero to 255.

The client 10 also includes a Received Sequence Number Generator 18 for providing values associated with an oldest request packet from the client 10 for which the client 10 has not received a response packet from the server 12. The Received Sequence Number Generator 18 includes a Minimum Sequence Number field 20 holding a value SMIN. If at least one request from the client 10 is currently outstanding, then the value SMIN represents the oldest request from the client 10 to the server 12 which has not yet received a response. If no requests are currently outstanding, then SMIN is equal to SNXT.

The client 10 includes a Request Packet Manager 22 for identifying request packets which have been transmitted to the server 12 for which the client 10 has not received a response packet from the server 12. The Request Packet Manager 22 includes a set of request status entries in a Status Flag Array 24 for storing an array of N status bits. The status bits represent the status of outstanding client requests.

The status bits within the Status Flag Array 24 are ordered and numbered from zero to N−1. A status bit in the zero position in the array of N status bits represents the status of the oldest outstanding request (i.e. the request packet having a sequence number equal to the value SMIN). In general, a status bit for a request having a sequence number S is located within the array of N status bits at the position S minus SMIN, modulo M (i.e., Flag[(S−SMIN) mod M]). The client 10 compensates for the wrap-around effect in the array in a known manner using modulo processing of the results of the subtraction. A status bit corresponding to a request having a sequence number S is set (to "1") when a request having a sequence number S is outstanding, and the corresponding status bit is reset (to "0") when a response to the request having sequence number S is received by the client 10.

Each client request process on the client 10 defines local variables for processing and sending (or re-sending) a request packet. These local variables comprise: $S_c$ which stores the sequence number corresponding to the present value of SNXT, and $P_c$ which is a buffer variable containing a request packet which is sent by the client 10 to the server 12.

Protecting the Integrity of Shared Client Variables

It should be noted that SNXT, SMIN, and the contents of the Status Flag Array 24 are variable values shared by all client request processes for a given client/server connection. These variables are accessed by all of the client request processes (described herein below) for a same client/server network connection. In order to ensure the integrity of these variables, only one client request process may access these variables at a time, and access to these variables is denied to all other client request processes during critical steps performed by the client request process summarized in FIG. 4 when the shared variables are read and/or modified.

In the illustrative embodiment of the present invention, data integrity is maintained by granting a client request process exclusive use of the central processing unit at least during the critical execution steps. More specifically, in an embodiment of the present invention a client request process claims exclusive use of a client CPU by masking interrupts in a known manner until the client request process reaches a stage of execution wherein the client request process must wait for a response packet to be received by the client 10. At that point, the interrupts are enabled and the client request process relinquishes the client CPU. Other schemes for protecting the integrity of shared variables will be known to those skilled in the art.

The Server Data Structures

Continuing with the description of FIG. 3, the server 12 includes a New Request Sequence Number Generator 26 for providing a sequence value associated with a next new request packet from the connected client 10. The New Request Sequence Number Generator 26 includes a New Request Sequence Number field 28 for the client/server connection. The New Request Sequence Number field 28 holds a value SNEW identifying the sequence number for a packet representing the newest request expected by the server 12 from the connected client 10. In the illustrative embodiment of the invention, the value SNEW ranges from zero to 225.

In the illustrative embodiment of the present invention, the server 12 includes a Response Buffer 30 for buffering unacknowledged response packets. The Response Buffer 30 includes a Response Buffer Array 34. In the illustrative embodiment of the present invention, the Response Buffer 30 stores a response packet within the Response Buffer Array 34 for the client/server connection until the server 12 receives an acknowledgement that the client 10 received the response packet. Buffering response packets in the illustrative embodiment avoids the necessity of a server re-generating a new response packet when a response packet to a client is dropped. In the illustrative embodiment of the present invention, the Response Buffer Array 34 has entries zero to (N−1) for buffering up to N response packets from the server to the connected client. As will be recalled, the value N is equal to the maximum number of outstanding distinct requests allowed by the client 10 in accordance with Rule 1 above. Alternative embodiments may include a greater or smaller quantity of response packet buffers. The advantages of having N buffers will become apparent in view of the acknowledgement scheme described below.

In accordance with another aspect of the illustrative embodiment of the invention, the server 12 and client 10 utilize the sequence numbers associated with request packets to acknowledge the receipt by the client 10 of a previous response transmitted by the server 12. More specifically, since the client 10 cannot send a request having a new sequence number value S' equal to (S+N) until the client 10 receives a response packet for the previous request having a sequence number value S, the receipt by the server 12 of a new request packet from the client 10 having a sequence number S' indicates to the server 12 that the client 10 received a previous response packet for the previous request having a sequence number value S.

For example, where N equals 3, the receiving by the server 12 of a request packet having a sequence number S' equal to 7 acknowledges the receipt by the client 10 of a response packet having a sequence number S equal to 4. Therefore, upon receiving the request packet having a sequence number S' equal to 7, the server 12 deletes the buffered response packet having sequence number S equal to 4 from the Response Buffer Array 34.

The Response Buffer 30 also includes a Response Buffer Index field 32. The Response Buffer Index field 32 holds a value RNEW for identifying a one of the N entries of the Response Buffer Array 34 for buffering a response packet generated by a server response process. In the illustrative embodiment of the invention, the value RNEW ranges from zero to 7.

Each server response process defines local variables for processing and sending (or re-sending) a response to a request. These local variables comprise: $S_s$ which stores the sequence number of a received request packet, $R_s$ which stores the RNEW value for a received request, and $P_s$ which is a buffer variable containing a response packet which is stored in the Response Buffer Array 34 and sent by the server 12 to the client 10.

Protecting the Integrity of Shared Server Variables

It should be noted that SNEW, RNEW, and the contents of the Response Buffer Array 34 are variables shared by all server response processes for a given client/server connection. These variables are accessed by all of the server response processes (described herein below) for a same client/server network connection. In order to ensure the integrity of these variables, only one server response process may access these variables at a time, and access to these variables is denied to all other server response processes during critical steps of the server response process procedure summarized in FIG. 5 when the shared variables are read and/or modified.

In the illustrative embodiment of the present invention, data integrity is maintained by granting a server response process exclusive use of the central processing unit at least during the critical execution steps when the shared variables are read and/or modified based upon a previously read value of a shared variable. More specifically, in an embodiment of the present invention a server response process claims exclusive use of a server CPU by masking interrupts in a known manner until the server response process reaches a stage of execution wherein the server response process must wait for another system resource to provide a response while processing a client request in step 216 (of FIG. 5). At that point, the interrupts are enabled and the server response process relinquishes the server CPU. Other schemes for protecting the integrity of shared variables would be known to those skilled in the art.

Initialization of the Client/Server Connection and Data Structures

When a process running on the client 10 initially submits a request for services from the server 12 for which a network connection has not been established, the client 10 and server 12 establish a connection in a known manner. In addition, the client 10 and server 12 initialize their respective data structures (described above) for facilitating multiple outstanding requests on the connection.

The client 10 initializes the value SNXT of the Next Sequence Number field 16 to zero, initializes the value SMIN of the Minimum Sequence Number field 20 to zero, and sets all N status bits of the Status Flag Array 24 to zero. The server 12 initializes the value SNEW of the New Request Sequence Number field 28 to zero, initializes the value RNEW of the Response Buffer Index field 32 to zero, and initializes each of the entries of the Response Buffer Array 34 to NIL (indicating that the respective buffer entries are not filled).

Description of the Client Request Process

Figure 4:
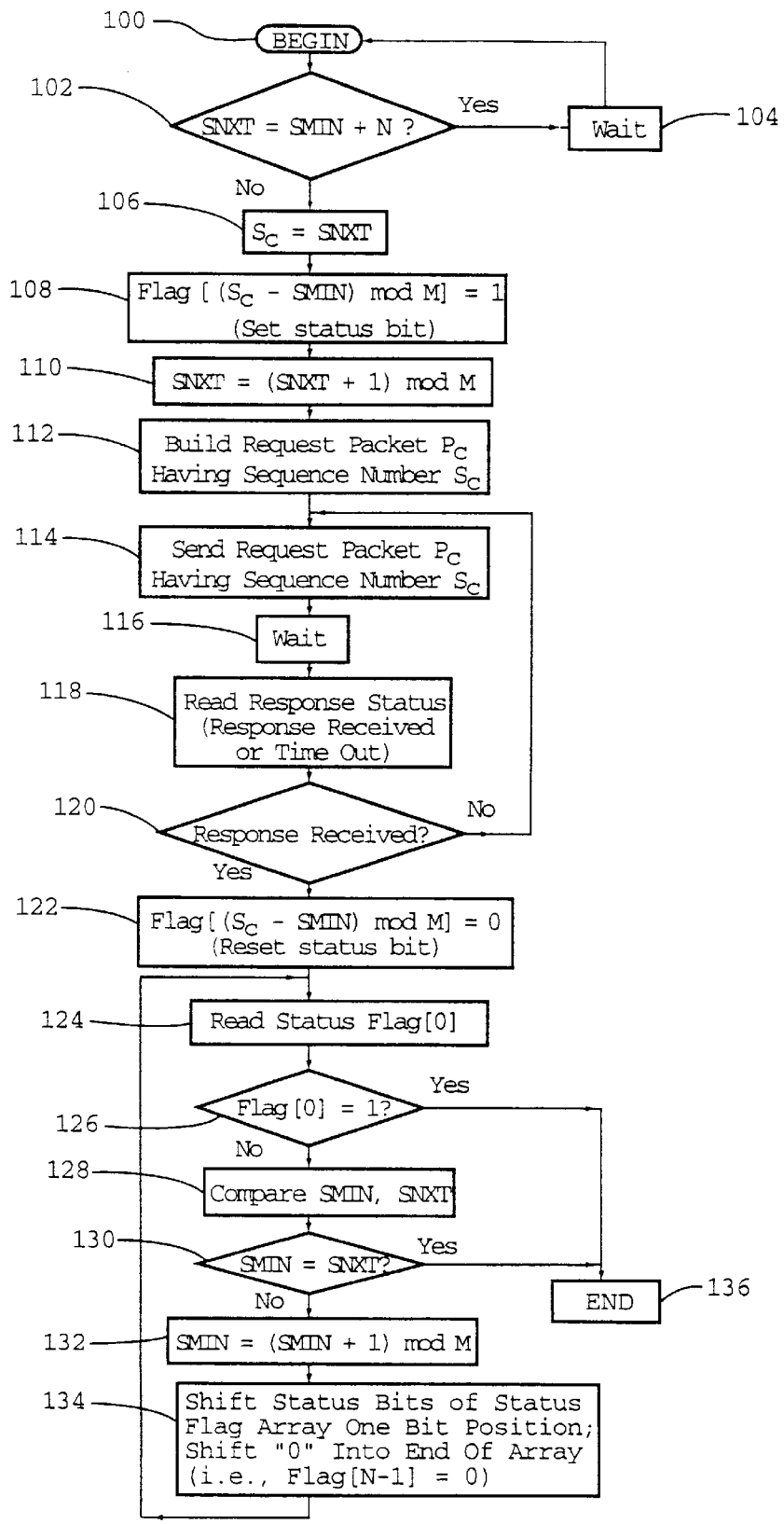
FIG. 4 is a flowchart summarizing the steps executed by a client request process for implementing a set of transport rules for network communication between a client and server in accordance with an illustrative embodiment of the present invention.

Turning now to FIG. 4, the steps are summarized for a single client request procedure. After completion of the above summarized client set-up procedures, the client creates a client request process for performing the steps summarized in FIG. 4 for each client request on the connection. The steps executed by a client request process generally comprise: sending a request packet (after a wait, if necessary), waiting for a response, re-sending a request packet in the event of a dropped request or response, and updating the shared variables when a response packet for the request packet has been received by the client.

At step 100 the client request process begins and control passes to step 102. Rule 1, provided hereinabove, defines the maximum range of sequence numbers for outstanding requests for a client and server connection. In order to ensure compliance with Rule 1, if at step 102 the client determines that SNXT equals ((SMIN+N) mod M), then control passes to step 104 wherein the procedure waits for another instance of a client request process to advance the value SMIN in response to receipt by the client 10 of a response packet having a sequence number S equal to SMIN. Thereafter, control passes from step 104 back to step 100.

It will be appreciated that more than one client request process may be waiting at step 104 for the value of SMIN to advance (after the client receives a response packet for an oldest outstanding request packet). In such instances a queuing scheme may be introduced for handling the multiple client processes waiting at step 104. Under such a scheme, the client operating system provides client request processes the opportunity to exit the wait step 104 in the order in which the client request processes enter the Wait step 104. Of course, other acceptable ways for handling multiple processes waiting for access to a limited resource (e.g. prioritizing and random selection) will be known to those skilled in the art).

If however at step 104, the client determines that SNXT does not equal ((SMIN+N) mod M), then control passes to step 106 wherein the client request process assigns the value SNXT to a variable $S_c$ for the client request process. The value of variable $S_c$ equals the sequence number inserted within the NCP header of a request packet issued by the client request process to the server 12. Control then passes to step 108 wherein the client request process updates the Status Flag Array 24 by setting a status bit within the Status Flag Array 24 corresponding to the request. Where the bits of the Status Flag Array 24 are numbered from zero to (N−1), a status bit in the Status Flag Array 24 is identified (on the left side of Equation 1) and set at step 108 in accordance with the equation:

$$\text{Flag}[(S_c-\text{SMIN}) \bmod M]=1. \qquad \text{Equation 1}$$

Thus, each bit set equal to "1" in the Status Flag Array 24 corresponds to a request that has been sent but not responded to by the connected server 12.

Control then passes to step 110 wherein the client increments the value SNXT in the Next Sequence Number field 16. By incrementing SNXT after assigning its current value to a sequence number for a request packet, the sequence number S assigned to a next request packet assigned by another client request process will be the next available sequence number. In view of the limitation of the range of sequence numbers, M, the incrementing of the value SNXT is performed modulo M. Control next passes to step 112.

At step 112 a request packet $P_c$ is constructed in a known manner which includes within its packet header the sequence number stored within the variable $S_c$ (assigned during step 106). After building the request packet is complete, control passes to step 114 wherein the request packet originating from the client request process and having a sequence number provided by the variable $S_c$ is transmitted in a known manner to the server 12. The request packet is buffered by the client 10 in case either the request packet or its corresponding response packet is dropped during transmission over the network. Control then passes to a WAIT step 116 wherein execution of the client process is suspended while the client process waits for the server 12 to send a response packet corresponding to the request packet (i.e. having a sequence number equal to the value of $S_c$). The client request process remains in the suspended state until either the client 10 receives a response packet having a sequence number equal to the variable $S_c$ associated with the client request process or a wait period has expired. In either case, a response packet handler for the client 10 identifies the waiting client process and re-starts the waiting client process. Control then passes to step 118.

At step 118, a request handling routine for the reactivated client process reads status information in order to determine why the wait was terminated. Control then passes to step 120 wherein if a response packet having a sequence number equal to the variable $S_c$ associated with the client request process has been received, then control passes to step 122 and the status bit corresponding to the request packet is reset. Resetting the status bit indicates the request is no longer outstanding. Where the bits of the Status Flag Array 24 are numbered from 0 to (N−1), a status bit in the Status Flag Array 24 is reset in accordance with the Equation 2 in order to indicate that the request is no longer outstanding.

$$\text{Flag}[(S_c-\text{SMIN}) \bmod M]=0 \qquad \text{Equation 2}$$

Control next passes to step 124 and the value of the status bit at position zero of the Status Flag Array 24 is read. The status bit at position zero corresponds to the oldest outstanding request when the response packet associated with the client request process was received by the client 10.

Control passes to step 126. If the status bit at position zero equals one (indicating that the oldest outstanding request is still waiting for a response), then control passes to an End step 136. If however at step 126, the status bit at position zero of the Status Flag Array 24 equals zero (indicating that a response packet has been received having a sequence number equal to the current value of SMIN), then control passes to step 128.

At step 128 the values of SMIN and SNXT are compared. Next, control passes to step 130 wherein if the value SMIN equals SNXT (indicating that (1) there are no longer any outstanding requests and (2) all status variables of the client 10 reflect this status), then control passes to the End step 136.

If, however, at step 130 SMIN does not equal SNXT, then control passes to step 132 and the value SMIN is incremented by one, modulo M. Next, control passes to step 134 wherein the status bits are shifted by one position in order to shift the zero value at position zero in the Status Flag Array 24 out of the Status Flag Array 24. The status bit at position one is shifted into the zero position in the Status Flag Array 24, etc. A zero value is shifted into the Status Flag Array 24 at position N−1 (a status bit corresponding to an outstanding request having a sequence number equal to "SMIN+(N−1)"). Control then passes to step 124 in order to account for intermediate packets for which the client has already received a response. The effect of this status bit shifting loop is to update the value of SMIN (to indicate the next oldest outstanding request packet) every time the client receives a response for the oldest response from the server and to advance the position of remaining status bits by one each time SMIN is incremented. Thus, the status bit at the zero position of the Status Flag Array 24 indicates the status of the request packet having a sequence number equal to the value of SMIN.

If however at step 120 a response packet corresponding to the client process' request packet has not been received, control passes to step 114 and the client request process re-sends the request packet P (stored in a packet buffer associated with the client request process).

In FIG. 4, the client request process is infinitely patient with respect to repeated time-out failures. The client request process will continue to return to step 114 until a response packet for the client request process is received by the client. However, those skilled in the art will appreciate that alternative embodiments of the invention will include known escape mechanisms wherein the client request process automatically discontinues the re-sending of the request packet.

Those skilled in the art will also appreciate various alternatives for dealing with the repeated failure to obtain a response packet for the client/server connection. For example, the client may extinguish the client/server connection and discontinue all client request processes currently using the extinguished client/server connection. Other alternative connection failure recovery mechanisms will be known to those skilled in the art.

The Server Process

Figure 5:
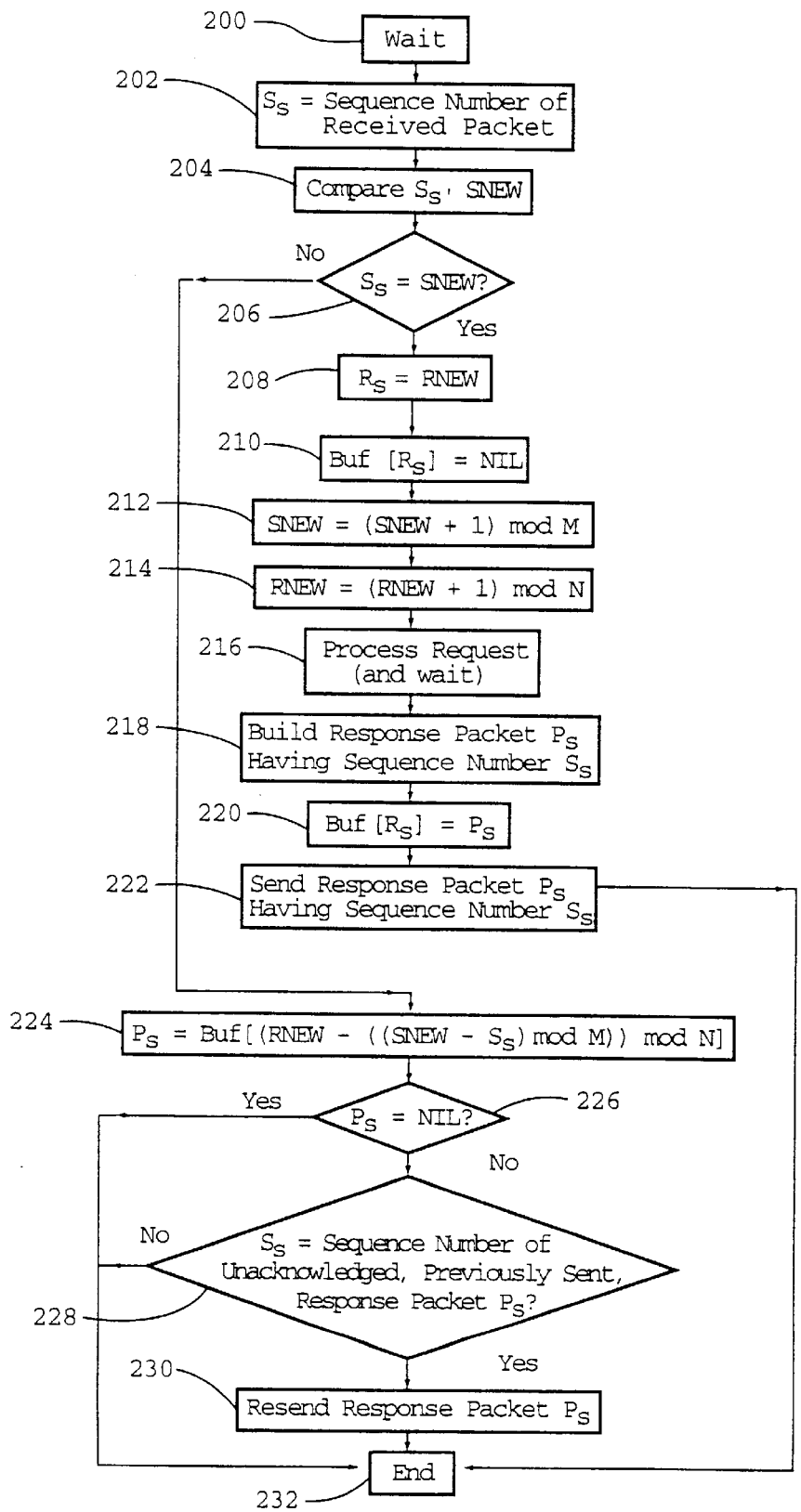
FIG. 5 is a flowchart summarizing the steps executed by a server response process for implementing a set of transport rules for network communication between a client and server in accordance with an illustrative embodiment of the present invention.

Turning now to FIG. 5, a summary is provided of the steps executed by a server response process which is initiated by the server 12 each time a request is received from the client 10. The procedure generally comprises receiving a request packet, processing the request packet, and sending a response to the request packet. If necessary, dropped responses (i.e., ones that are not received for some reason by the client 10) are retrieved from the Response Buffer Array 34 and re-sent by the server 12 to the client 10.

As previously mentioned, a client/server connection must be established between a client and a server before the server receives any request packets from the client. In response to a request by the client to the server to prepare to receive request packets from the client and before receiving a first request packet from the client on the connection, the server initializes the value SNEW of the New Request Sequence Number field to zero, sets RNEW to zero, and sets the N buffers of the Response Buffer Array 34 to NIL (indicating that the corresponding buffer entries are unused). After performing the above shared variable initialization procedures, the server creates a set of N instances of the server response process summarized in FIG. 5. Thereafter, the server creates additional server processes as the initiated server processes end (at step 232). In the alternative, the N server processes may be recycled after reaching the End step 232. There are, of course, a number of ways for a server to allocate server processes. These methods of process allocation would be known to those skilled in the art.

As shown in FIG. 5, after initiation each server process enters a suspended state at step 200 until a request packet is received by the server 12 from a client process and directed to the suspended server process. The directing of the received request packet to the one of the waiting server response processes activates the suspended server process in a manner known to those skilled in the art. Control then passes to step 202.

At step 202 the local variable $S_s$ for the server response process is assigned the sequence number of the received request packet. Control passes to step 204 where the variables $S_s$ and SNEW are compared. Control then passes to step 206 wherein if $S_s$ equals SNEW, then the received request packet represents a new request from the client and control passes to step 208.

At step 208, the variable $R_s$ is assigned the value RNEW. $R_s$ indexes the next available entry of the Response Buffer Array 34 where a response to the new request will be buffered. Control then passes to step 210 wherein the buffer entry at position $R_s$ of the Response Buffer Array 34 is set to NIL in order to indicate that the server has not yet generated a response for the request packet having sequence number $S_s$.

Next, control passes to step 212 where SNEW is incremented by one (mod M). Control passes to step 214 where RNEW is incremented by one (mod N). The incrementing of SNEW and RNEW in steps 212 and 214 causes these variables to reflect the present status of the server 12 after receiving the request packet for which the server response process was activated.

Control then passes to step 216 where the server response process performs known steps for servicing the request embedded within the request packet. During step 216, the server response process relinquishes exclusive use of the server processor in order to allow other processes to utilize the server's resources. As a result, later activated server response processes requiring less time to process their associated client request may complete the request processing step before an earlier activated server response process completes the request processing step. In such instances, the server 12 will transmit response packets to the client 10 in an out of order manner. However, in accordance with one aspect of the invention, receiving responses in an order different from the order of requests does not present a problem for either the client or the server due to the flexibility of the client 10 and server 12 recording the status of all pending requests from the client 10.

After the server response process completes a response to the request, control passes to step 218 and the server response process builds a response packet having a sequence number $S_s$ in a manner which would be known to those skilled in the art and stores the response packet in a response buffer $P_s$. Control then passes to step 220 where the buffer entry of the Response Buffer Array 34 indexed by the variable $R_s$ is loaded with the response packet currently stored in the response buffer $P_s$. Control then passes to step 222 where the server 12 sends the response packet having sequence number $S_s$ to the client 10. Control then passes to an End step 232.

If, however, at step 206 the value of the sequence number $S_s$ for a received request does not equal SNEW (i.e., this is not the next expected new request), then control passes to step 224 where the response buffer $P_s$ is assigned the contents of the response buffer in accordance with the following equation:

$$P_s = \text{Buf}[(RNEW-((SNEW-S_s) \bmod M)) \bmod N] \quad \text{Equation 3}$$

The effect of Equation 3 is to take an appropriate number of steps backward into the array of buffered responses based upon the difference between the expected next sequence number SNEW for a new request packet and the actual sequence number $S_s$, and to assign the identified buffered response to the response buffer $P_s$ for re-transmission to the client 10.

For example, if SNEW equals 2 and $S_s$ equals 1, and RNEW equals 1, then the client is requesting a re-sending of the response to the request packet having sequence number equal to one (1). The buffered response packet corresponding to the request packet having sequence number equal to one (1) is stored in the Response Buffer Array 34 at position zero (0) at the time the server 12 received the retransmitted request packet.

After step 224 is completed, control passes to step 226 wherein if $P_s$ equals NIL (indicating that the server is presently processing this request packet), then control passes to the end step 232.

If, however, at step 226, $P_s$ does not equal NIL, then control passes to step 228 wherein if the value of $S_s$ corresponds to an unacknowledged, previously sent response packet, then control passes to step 230 wherein the server 12 re-sends response packet $P_s$ in accordance with the value assigned to the response buffer $P_s$ during step 224. Control then passes to the end step 232.

In the illustrative embodiment of the present invention, step 228 also handles the case where the sequence number $S_s$ represents a value greater than SNEW, thus indicating that a previous request from the client 10 to the server 12 has been dropped. In such a case, control passes to the end step 232 without further processing of the request packet having sequence number $S_s$. Therefore, in the illustrative embodiment of the present invention, out of order request packets are disregarded by the server 12, and it is left to the client 10 to resend any dropped request packets as well as any subsequent out-of-order request packets arising from the dropped request packet. It will be appreciated in view of the described embodiment of the present invention that the server 12 may, in the alternative, process out-of-order requests rather than dropping the request as described in step 228.

Turning finally to FIG. 6, a set of communications between a client and server are summarized in accordance with an illustrative example of the present invention where the range of sequence values (M) equals 7 and the maximum range of sequence numbers of outstanding requests (N) equals 3. The left-most column of FIG. 6, entitled "SUMMARY OF ACTION", describes a set of packet transmissions occurring between a client and server in exchanging a series of requests and responses. In the summarized set of actions, all of the requests are transmitted from the client to the server, and all of the responses are transmitted from the server to the client. The middle set of three columns, entitled "CLIENT", summarize the initial state of the client variables (in the top row) and the status of the client variables resulting from each of the described actions listed in the left-most column. The right set of three columns, entitled "SERVER", summarize the initial state of the server variables (in the top row) and the status of the server response process variables resulting from each of the described actions summarized in the middle column of FIG. 6.

The status bits for the flag field are, from left to right, bits 0, 1, and 2, respectively. The entries in the buffer array correspond, from left to right, to the entries of the response buffer array 0, 1, and 2, respectively. A dash in a buffer array entry indicates a value NIL, whereas a number identifies a sequence number corresponding to a buffered response packet.

Though an illustrative embodiment of the present apparatus and method for supporting multiple outstanding requests from a client to a server has been described, it would of course be known to one of ordinary skill in the area of network hardware and software architecture in general to make certain modifications to the aforementioned apparatus and method. Examples of changes include alternative network settings, alternative data structures for implementing the maintaining of the status of the plurality of outstanding network requests from a client to a server, alternative sequences of values to the preferred use of a finite set of integer values, and modifications to the magnitude of the set of recycled sequence of integer values and the maximum difference (number of interposed sequence values) between an oldest sequence value and a next sequence value for request packet. It is therefore the intent of the inventor to claim all alternative embodiments that do not depart from the scope and spirit of the invention described in the appended claims.

What is claimed is:

1. A computer-readable medium having computer executable instructions for performing steps in a client in order to maintain status information of network requests issued by the client on a single connection to a server in a first order and for which the client receives request responses from the server in an order differing from the first order, said steps comprising:

building a client status information structure identifying each request on the single connection for which a corresponding response has not been received from the server;

transmitting a first request packet to the server;

transmitting a second request packet to the server after transmitting the first request;

receiving a response to the second request before receiving a response to the first request; and updating, before receiving the response to the first request, the client status information structure to indicate the receipt by the client of the response to the second request.

2. The computer-readable medium of claim 1 having further computer-executable instructions for performing the steps of:

receiving the response to the first request after receiving the response to the second request; and updating the client status information structure to indicate the receipt by the client of the response to the first request.

3. The computer-readable medium of claim 2 wherein the client status information structure supports up to N requests from the client on the connection for which responses have not been received from the server, said computer-readable having further computer-executable instructions for performing the steps of:

determining, before receiving the response to the first request, that N minus one new requests have been transmitted by the client to the server after transmitting the first request; and delaying transmitting a next request to the server in response to the determining step.

4. The computer-readable medium of claim 3 wherein the client status information structure includes an oldest request value indicating a sequence value for an oldest request from the client to the server for which a response has not been received by the client and a next request value indicating a sequence value for the next request from the client to the server, and wherein the computer-executable instructions for the determining step perform the step of:

comparing the oldest request value to the next request value.

5. The computer-readable medium of claim 2 having further computer-executable instructions for performing the step of:

updating the client status information structure to indicate transmission by the client of the first request in association with transmitting the first request.

6. The computer-readable medium of claim 5 wherein the client status information structure includes a next request value field storing a sequence value for a next request from the client on the connection and a set of request status entries corresponding to an oldest request from the client to the server for which the client has not received a response and subsequent requests from the client to the server, the set of request status entries indicating whether a corresponding response has been received by the client, and wherein the computer-executable instructions for the re-calculating step comprise instructions for performing the steps of:

incrementing the next request value; and setting a corresponding entry within the set of request status entries to indicate that the first request has been transmitted by the client to the server.

7. The computer-readable medium of claim 6 wherein the client status information further includes an oldest request value indicating a sequence value for an oldest request from the client on the connection for which a response has not been received by the client, and wherein the first updating step further comprises computer-executable instructions for performing the steps of:

resetting a corresponding entry of the set of request status entries to indicate receipt by the client of a response corresponding to the second request packet; and determining that a sequence value for the second request does not correspond to the oldest request value.

8. The computer-readable medium of claim 7 wherein the second updating step further comprises the steps of:

resetting a corresponding entry of the set of request status entries to indicate the receipt by the client of the response corresponding to the first request; and determining that a sequence value for the first request packet corresponds to the oldest request value, and in response performing the further steps of:

incrementing the oldest request value to provide a new oldest request value;

removing the entry corresponding to the first request from the set of request status entries; and advancing the position of remaining entries of the set of request status entries.

9. The computer-readable medium of claim 8 further including computer-executable instructions for performing the steps of:

determining that the sequence value for the second request corresponds to the new oldest request value as a result of the incrementing step, and in response performing the further steps of:

incrementing the new oldest request value;

removing an entry corresponding to the second request packet from the set of request status entries; and advancing the position of remaining entries of the set of request status entries.

10. A method, in a server, for supporting multiple outstanding requests on a single connection between the server and a client, the method comprising the following steps performed by the server of:

(a) receiving a first request issued by the client on the single connection, and having a first sequence value;

(b) receiving a second request issued by the client on the single connection, and hating a second sequence value indicating that the client issued the second request after the first request;

(c) issuing an initial response to the second request; and (d) issuing an initial response to the first request after the issuing step (c).

11. The method of claim 10 wherein the server maintains a response buffer including entries for storing at least N transmitted responses to the client on the connection, and wherein the method further comprises the steps of:

receiving an Nth new request from the client on the single connection after the first request; and rendering, in response to receiving the Nth new request, a buffer entry allocated to a buffered copy of the initial response to the first request available for storing a new buffered copy of a transmitted response.

12. The method of claim 11 wherein the response buffer maintains copies of exactly N transmitted responses, and wherein the method further comprises the step of:

storing an Nth response, corresponding to the Nth new request, in a buffer entry allocated to the buffered copy of the initial response to the first request.

13. The method of claim 11 further comprising the steps of:

maintaining a new request sequence value generator for providing a sequence value associated with a next new request from the client on the single connection;

receiving a re-transmitted request from the client corresponding to a previously transmitted response;

retrieving from the response buffer, for re-transmission to the client, a buffered response corresponding to the previously transmitted response based upon a sequence value contained within the re-transmitted request and the sequence value associated with a next new request.

14. The method of claim 11 further comprising the steps of:

maintaining a new request sequence value generator for providing a sequence value associated with a nest new request from the client on the single connection;

receiving a re-transmitted request from the client corresponding to a previously transmitted response;

retrieving from the response buffer, for re-transmission to the client, a buffered response corresponding to the previously transmitted response based upon:

a sequence value contained within the re-transmitted request, the sequence value associated with the next new request, and an index pointer indicating a next response buffer entry for storing a copy of a response to the next new request from the client on the single connection.

15. A computer-readable medium having computer executable instructions for performing steps in a server in order to support multiple outstanding requests on a single connection between the server and a client, such that responses from the server need not follow the order in which corresponding requests were received from the client, said steps comprising:

(a) registering receipt of a first request issued by the client on the single connection having a first sequence value;

(b) registering receipt of a second request issued by the client on the single connection having a second sequence value indicating that the client issued the second request after the first request;

(c) issuing an initial response to the second request; and (d) issuing an initial response to the first request after the issuing step (c).

16. The computer readable medium of claim 15 wherein further computer executable instructions perform the steps of:

maintaining a response buffer including entries for storing at least N transmitted responses to the client on the connection;

registering receipt of an Nth new request from the client on the single connection after the first request; and rendering a buffer entry allocated to a buffered copy of the initial response to the first request available for storing a new buffered copy of a transmitted response in response to receiving the Nth new request.

17. The computer readable medium of claim 16 wherein further computer executable instructions perform the steps of:

maintaining a response buffer for storing exactly N transmitted responses; and storing an Nth response, corresponding to the Nth new request, in a buffer entry allocated to the buffered copy of the initial response to the first request.

18. The computer readable medium of claim 16 wherein further computer executable instructions perform the steps of:

maintaining a new request sequence value generator for providing a sequence value associated with a next new request from the client on the single connection;

registering receipt of a re-transmitted request from the client corresponding to a previously transmitted response;

retrieving from the response buffer, for re-transmission to the client, a buffered response corresponding to the previously transmitted response based upon a sequence value contained within the re-transmitted request and the sequence value associated with a next new request.

19. The method of claim 16 further comprising the steps of:

maintaining a new request sequence value generator for providing a sequence value associated with a next new request from the client on the single connection;

registering receipt of a re-transmitted request from the client corresponding to a previously transmitted response;

retrieving from the response buffer, for re-transmission to the client, a buffered response corresponding to the previously transmitted response based upon:

a sequence value contained within the re-transmitted request, the sequence value associated with the next new request, and an index pointer indicating a next response buffer entry for storing a copy of a response to the next new request from the client on the single connection.

20. A server supporting multiple outstanding requests on a connection with a client, the server comprising:

a new request sequence value generator for providing a sequence value for a next new request from the client on the connection;

a response buffer comprising:

a set of at least N buffer entries; and a buffer index providing a buffer index value for referencing the at least N buffer entries; and a response processor for issuing a response to a request from the client on the connection and storing a copy of the response within one of the N buffer entries based upon:

a sequence value assigned to the request, a current value of the sequence value for a next new request, and the buffer index value.

* * * * *

UNITED STATES PATENT AND TRADEMARK OFFICE
CERTIFICATE OF CORRECTION

PATENT NO. : 5,867,652
DATED : February 2, 1999
INVENTOR(S) : Hurvig

It is certified that errors appear in the above-identified patent and that said Letters Patent is hereby corrected as shown below:

In Column 9, Line 56: "Wait" should read --wait--.

In Claim 10, Column 16, Line 22: "hating" should read --having--.

In Claim 14, Column 16, Line 61: "nest" should read --next--.

Signed and Sealed this

Sixteenth Day of November, 1999

Attest:

Q. TODD DICKINSON

*Attesting Officer*          *Acting Commissioner of Patents and Trademarks*